United States Patent
Miller

(10) Patent No.: US 12,293,209 B2
(45) Date of Patent: *May 6, 2025

(54) ISOLATED PHYSICAL NETWORKS FOR NETWORK FUNCTION VIRTUALIZATION

(71) Applicant: Ribbon Communications Operating Company, Inc., Westford, MA (US)

(72) Inventor: Paul Miller, Derry, NH (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,078

(22) Filed: Mar. 16, 2022

(65) Prior Publication Data

US 2022/0237018 A1   Jul. 28, 2022

Related U.S. Application Data

(63) Continuation of application No. 15/331,661, filed on Oct. 21, 2016, now Pat. No. 11,288,084.

(60) Provisional application No. 62/245,065, filed on Oct. 22, 2015.

(51) Int. Cl.
   *G06F 9/455* (2018.01)
   *H04L 41/12* (2022.01)

(52) U.S. Cl.
   CPC .......... *G06F 9/45558* (2013.01); *H04L 41/12* (2013.01); *G06F 2009/45595* (2013.01)

(58) Field of Classification Search
   CPC ....... G06F 9/45558; G06F 2009/45595; H04L 41/12; H04L 41/122
   USPC ........................................................ 709/223
   See application file for complete search history.

(56) References Cited

U.S. PATENT DOCUMENTS

| | | | | |
|---|---|---|---|---|
| 8,990,470 | B1* | 3/2015 | Sala | G06F 13/4022 |
| | | | | 710/305 |
| 9,237,125 | B1* | 1/2016 | Bardgett | H04L 63/02 |
| 2012/0110657 | A1* | 5/2012 | Kang | H04L 63/0236 |
| | | | | 726/13 |
| 2015/0082378 | A1* | 3/2015 | Collison | H04L 63/20 |
| | | | | 726/1 |
| 2015/0355946 | A1* | 12/2015 | Kang | G06F 9/5072 |
| | | | | 718/104 |
| 2016/0057209 | A1* | 2/2016 | Parikh | H04L 41/5051 |
| | | | | 709/203 |

(Continued)

FOREIGN PATENT DOCUMENTS

CN         103746997 A    *   4/2014

OTHER PUBLICATIONS

Navid nikaein, Eryk Schiller, Romain Favraud, Kostas Katsalis, Donatos Stavropoulos, Islam Alyafawi, Zhongliang Zhao, Torsten Braun, and Thanasis Korakis, "Network Store: Exploring Slicing in Future 5G Networks", Sep. 7, 2015, Mobiarch'15, @2015 ACM.*

*Primary Examiner* — Wing F Chan
*Assistant Examiner* — John Fan
(74) *Attorney, Agent, or Firm* — Haynes and Boone, LLP

(57) ABSTRACT

A method includes, with a Virtual Network Function (VNF) component associated with a VNF, communicating with an access network over a first physical network connected to a first physical network interface of a physical machine associated with the VNF component. The method further includes, with the VNF component, communicating with a core network over a second physical network connected to a second physical network interface of the physical machine, the second network being isolated from the first network.

20 Claims, 7 Drawing Sheets

(56) References Cited

U.S. PATENT DOCUMENTS

2016/0330077 A1\* 11/2016 Jin ...................... H04L 41/0895
2016/0381662 A1\* 12/2016 Wang ................... H04W 12/00
                    370/329
2017/0230257 A1\* 8/2017 Bruun ................. G06F 9/45558

\* cited by examiner

ISOLATED PHYSICAL NETWORKS FOR NETWORK FUNCTION VIRTUALIZATION

PRIORITY INFORMATION

The present application is a continuation of U.S. patent application Ser. No. 15/331,661 filed Oct. 21, 2016, which claims priority to U.S. Provisional Application No. 62/245,065 filed Oct. 22, 2015, the disclosures of which are hereby incorporated by reference in their entireties.

BACKGROUND

The present disclosure relates generally to Network Functions Virtualization (NFV), and more particularly to methods and systems for managing physical and virtual networks associated with Virtual Network Functions (VNFs).

NFV is a concept that involves virtualization of various telecommunication functions that are then interconnected to provide telecommunication services. Particularly, specific telecommunication functions that are typically performed by specialized pieces of hardware are replaced with a virtualization of such hardware. The virtualized functions that would otherwise be performed by such hardware are referred to as Virtual Network Functions (VNFs).

One example of such hardware that can be virtualized in the form of a VNF is a Session Border Controller (SBC). An SBC acts as a gateway between an access network and a core network. An access network is a public network that is used to connect subscribers to a service provider. A core network is a private network that is controlled and managed by the service provider. The core network includes the equipment and functionality to provide the telecommunication service to the subscribers.

NFV can utilize various computing and networking technologies such as cloud computing and Software-Defined Networking (SDN). Cloud computing typically involves several physical computing systems that, through the use of a hypervisor, present virtual machine environments for use by guest operating systems. The guest operating systems can run applications as a physical computing system does. Applications related to VNFs can be run on such guest operating systems.

SDN is an approach to networking that separates the control plane from the data plane. By contrast, a legacy system may include several independently configured routers, whereas a system implementing SDN may include a central management component that makes decisions as to where traffic should be sent and then directs underlying systems to route network traffic as appropriate. SDN concepts can be used in the physical networks that interconnect the physical computing systems that provide a virtual machine environment.

BRIEF DESCRIPTION OF THE DRAWINGS

Aspects of the present disclosure are best understood from the following detailed description when read with the accompanying figures.

Figure 1:
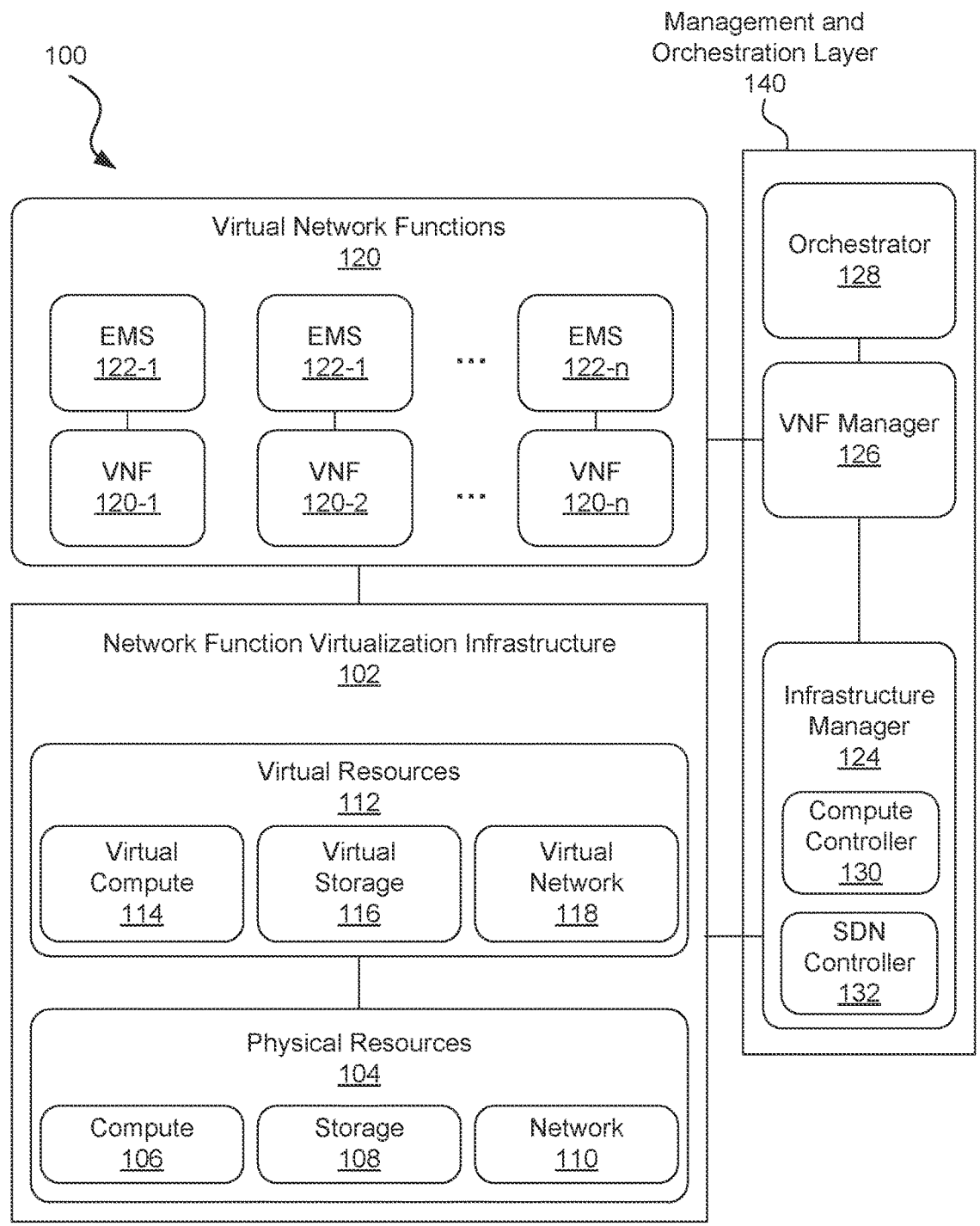
FIG. 1 is a diagram showing network function virtualization, according to one example of principles described herein.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, NFV utilizes several virtual machines in a cloud computing environment to perform telecommunication functions that were previously provided by specialized pieces of hardware. When such functions are performed by a physical piece of hardware, such as an SBC, there is a distinct separation between a connection to the access network and a connection to the core network. Specifically, there are one or more interfaces within the physical SBC that connect to the access network. Additionally, there are one or more separate physical interfaces that connect to the core network.

A VNF that emulates an SBC typically resides in a cloud environment. Thus, the data traffic between the VNF and the access network traverses the same physical cables as the data traffic between the VNF and the core network. This can create a number of security concerns. For example, a malicious entity may launch a denial-of-service attack on the VNF. A denial-of-service attack involves flooding a service provider with illegitimate traffic to suppress legitimate traffic. In the case of a VNF, if a malicious entity were to launch a denial-of-service attack against the VNF from the public access network, this would not only affect the access network, but would adversely affect the service provider's core network. This is because in a VNF, core network traffic and access network traffic traverse the same physical cables even though core traffic and access traffic are virtually segregated.

According to one example of principles described herein, to address the security concern described above, a datacenter is configured to run a VNF in a cloud computing environment yet have core network traffic and access network traffic traverse different physical cables. In one example, a datacenter includes a plurality of physical machines, each having more than one physical network interface. The datacenter includes at least two different, isolated networks. A first network is connected to the access network as well as to one of the physical network interfaces for each physical machine. A second network is connected to the core network as well as a different one of the physical network interfaces for each machine. The VNF can be configured so that when it communicates with the access network, it uses the physical network interface associated with the first physical network connected to the access network. When the VNF communicates with the core network, it uses the physical network interface connected to the second physical network connected to the core network. Thus, access network traffic and core network traffic can be segregated.

FIG. 1 is a diagram showing network function virtualization 100. According to the present example, a Network Function Virtualization Infrastructure (NFVI) 102 is used to provide network function virtualization 100. The NFVI 102 provides the infrastructure for a number of VNFs 120. Both the VNFs 120 and the NFVI 102 are managed by a management and orchestration layer 140.

The NFVI 102 includes a set of physical resources 104 that are used to provide a set of virtual resources 112. The physical resources 104 include computing resources 106, storage resources 108, and network resources 110. Other resources, such as input/output resources are contemplated as well. The physical resources 104 are typically embodied as a plurality of physical computing systems, sometimes referred to as servers, within a datacenter. For example, a datacenter may include several servers that are positioned on racks and interconnected via physical network cables. Each of the servers includes hardware including a physical processor, a memory, and a network interface. Some servers may be designed primarily for processing power and some servers may be designed primarily for storage. In one example, the servers are commodity servers that include a number of physical processors, such as x86 processors. The servers utilize an operating system, such as Linux, to provide various applications with access to the hardware of the servers. More specifically, the operating system will schedule processing tasks on the physical processor of the server and allocate physical memory for use by the application.

The computing resources 106 include a plurality of processors within a plurality of physical computing systems. The processors are designed to process machine readable instructions to perform specifically designed tasks. The processors can be designed to work together to provide parallel processing capabilities.

The storage resources 108 include various types of memory. Some types of memory, such as non-volatile types of memory, typically have large storage volume but relatively slow performance. The storage resources 108 may include a series of hard disk drives or solid state drives that store data in the form of machine readable instructions as well as large amounts of data. The storage resources 108 may also include volatile forms of memory, such as those used for Random Access Memory (RAM), which are optimized for speed and are often referred to as "working memory."

The network resources 110 include the physical network infrastructure that provides communication between the physical computing systems as well as to an external network such as the Internet. The physical network infrastructure includes the physical cables, such as Ethernet or fiber optic, that connect the physical systems to routers, switches, and other networking equipment that provides the desired interconnectivity.

The physical resources 104 use hypervisors to provide a virtual computing environment that provides the virtual resources 112. Specifically, the hypervisors provide virtual hardware to guest operating systems. A physical computing system may provide one or more virtual machines for use by guest operating systems. The virtual resources 112 include virtual computing resources 114, virtual storage resources 116, and virtual network resources 118. Such virtual resources 112 may emulate their underlying physical resource counterparts.

The virtual computing resources 114 include virtual processors that execute machine readable instructions as a physical processor does. The hypervisor then maps the execution of those instructions to execution of instructions on a physical processor. The architecture of the virtual processor does not necessarily have to match the architecture of the underlying physical processor, which allows a variety of instruction set architectures to be used for various virtual machines.

The virtual storage resources 116 include short term and long term storage services. Specifically, the virtual machines may include virtual memory that is then mapped to physical memory by the hypervisor. There does not necessarily have to be a one-to-one mapping of virtual memory to physical memory. For example, two gigabytes of virtual working memory may be mapped to only one gigabyte of working memory in the physical system. Various paging techniques are then used to swap physical memory from working memory to a volatile storage memory to allow for such mapping.

Each virtual machine may run a guest operating system. The guest operating system may be similar to a host operating system. For example, the guest operating system may also be Linux. The guest operating system runs applications and provides such applications with access the virtual hardware of the virtual machines. For example, the guest operating system schedules processing tasks associated with the applications on the virtual processor. The guest operating system also provides the application with access to virtual memory associated with the virtual machines.

When the guest operating system provides applications running thereon with access to the virtual resources, the hypervisor of the underlying physical computing systems then maps those resources to the underlying physical resources. For example, when an application running on the guest operating system stores data in virtual memory, the hypervisor uses a translates a virtual memory address into a physical memory address and the data is stored at that physical memory address. When the guest operating system schedules processing tasks for execution on the virtual processor, the hypervisor translates those processing tasks into executable instructions for the physical processor.

The virtual machines that are provided as part of the virtual resources 112 can be interconnected to each other through one or more virtual networks that make up the virtual networking resources 118. Such virtual networks emulate physical networks. Virtual networks may include a number of machines, both physical and virtual, that are assigned a virtual network address. The virtual networks can also isolate sets of virtual machines as desired. This can be helpful if some virtual machines are owned and/or operated by one entity and other virtual machines are owned and/or operated by another entity.

The NFVI 102 is managed by an infrastructure manager 124, which is part of the management and orchestration layer 140. The infrastructure manager 124 may operate under a set of pre-defined rules that instruct the infrastructure manager how to manage the NFVI 102. Such rules may be adjusted by a human operator as desired. For example, such rules may instruct the infrastructure manager 124 how to provision additional virtual machines when instructed to do so. The infrastructure manager 124 may include hardware, software, or a combination of both to perform various management functions. For example, the infrastructure manager 124 may be an application that resides on one or more physical machines and can receive input from human administrators as well as other management functions. The infrastructure manager 124 can then manage the physical and virtual environment as appropriate. For example, if it is determined that more virtual machines are desired, then the infrastructure manager 124 can send an instruction to the NFVI to create an additional virtual machine and configure it for use by whatever entity uses that virtual machine. Additionally, the infrastructure management can cause the physical computing systems to enter standby mode if less physical computing power is desired. The infrastructure manager 124 can also take such physical computing systems out of standby mode when more computing power is desired.

In the present example, the infrastructure manager 124 includes two components. Specifically, the infrastructure manager 124 includes a compute controller 130 and an SDN controller 132. The compute controller 130 is responsible for managing the cloud computing environment provided by the virtual resources 112 of the NFVI 102. For example, the compute controller 130 may be responsible for provisioning additional virtual machines within the cloud computing environment when instructed to do so. The compute controller 130 may have access to a set of pre-defined rules. Such rules may be configured and/or defined by a human administrator. Such rules may be stored as a data structure in physical memory. In one example, such rules may instruct the compute controller 130 how to tear down a virtual machine when instructed to do so. One example of a compute controller 130 includes the open-source cloud computing software platform provided by the Openstack Foundation under the name OpenStack™ via the compute controller service called Nova.

The SDN controller 132 is used to control the network resources of the NFVI 102. The SDN controller 132 may control both the physical network resources 110 and the virtual network resources 118. As will be described in further detail below, the SDN controller 132 receives instructions from various applications for how to configure the network infrastructure. The SDN controller 132 may have access to a set of pre-defined rules. Such rules may be configured and/or defined by a human administrator. Such rules may be stored as a data structure in physical memory. One example of a rule used by the SDN controller 132 may be how to establish virtual network connections when instructed to do so. One example of a SDN controller 130 includes the open-source cloud computing software platform provided by the Openstack Foundation under the name OpenStack™ via the compute controller service called Neutron.

As described above, a VNF 120 represents a virtualization of specific telecommunication functions that are typically performed by specialized pieces of hardware. Examples of a VNF 120 include, but are not limited to, an SBC, an Internet Protocol (IP) Multimedia Subsystem (IMS) network function, and a telephony application server. A VNF 120 may include a number of components, or instances of an application, that run within the virtual machine environment. Such applications are designed to emulate the specialized pieces of telecommunication hardware. Thus, instead of setting up a new physical piece of specialized equipment, a service provider can simply spin up a virtual machine environment and run applications. Each VNF 120 has a corresponding Element Management System (EMS) 122. The EMS 122 includes a user interface, or a dashboard, that allows an administrator to configure the VNF 120 as desired. To provide full NFV, several VNFs work together to provide the desired services. In the present example, a plurality of VNFs 120-1, 120-2 . . . 120-n and corresponding EMSs 122-1, 122-2 . . . 122-n are used to provide NFV.

An EMS 122 may have access to a set of pre-defined rules. Such rules may be configured and/or defined by a human administrator. Such rules may be stored as a data structure in physical memory. One example of a rule used by an EMS 122 may define what statistics should be collected regarding operation of the VNF 120.

A VNF 120 typically includes several different components, which may or may not be identical, that together form the full VNF 120. For example, the different components may be different instances of the VNF application. The different instances then work together to provide the functionality of the full VNF 120. Multiple VNFs 120 are then used in concert to provide a telecommunication network for a telecommunication service. A telecommunications network is an infrastructure that provides communication services between multiple subscribers. One example of a communication service is a Voice over IP (VoIP) service. Such services typically include several pieces of specialized hardware that perform specific network functions. However, according to principles described herein, the VNF 120 provides such functions instead of a specialized piece of hardware.

A VNF 120 may be part of a telecommunications core network. The core network is the central part of a telecommunications networks. The core network provides various communication services to the subscribers such as voice communication. Subscribers are connected to the core network through an access network, which will be described in further detail below. According to principles described herein, the VNF component can communicate with the core network over a first network and communicate with the access network over a second network. The first network is isolated from the second network such that communication between the VNF and the core network does not traverse the same physical network components as the communication between the VNF and the access network. Further concepts related to the core network and the access network are described in more detail below with respect to FIG. 3.

The VNFs 120 are managed by a VNF manager 126, which is part of the management and orchestration layer 140. In some cases, there may be multiple VNF managers 126, each managing one or more specific VNFs 120. The VNF manager 126 can manage the VNFs based on network demand. For example, at peak times, the VNF manager 126 can start up new instances of VNF components to scale dynamically according to demand. While there may be several VNF managers 126, there is a single orchestrator 128 that manages the VNF managers 126 and thus manages the entire NFV service. The VNF manager 126 may have access to a set of pre-defined rules. Such rules may be configured and/or defined by a human administrator. Such rules may be stored as a data structure in physical memory. One example of a rule used by the VNF manager 126 may be when to instruct the compute controller 130 to provision an additional virtual machine. For example, when demand for services reaches a certain threshold of capacity, the VNF manager 126 can instruct the compute controller to provision an additional virtual machine so that an additional VNF component can be provisioned.

Figure 2:
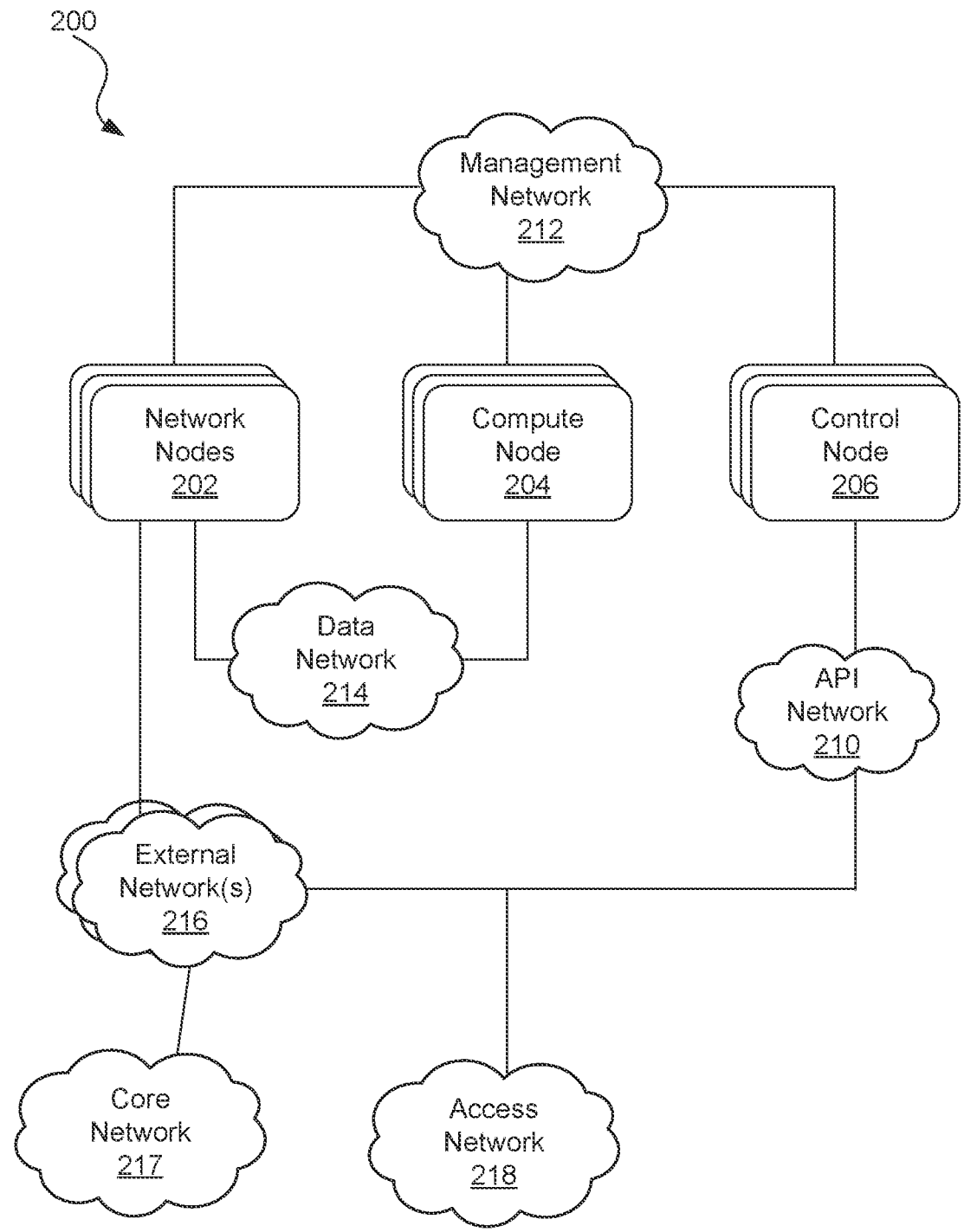
FIG. 2 is a diagram showing networks within a cloud computing environment, according to one example of principles described herein.

FIG. 2 is a diagram showing networks within a cloud computing environment. According to the present example, the cloud computing environment 200 includes a number of network nodes 202, a number of compute nodes 204, and a number of controller nodes 206. Various networks exist within the cloud computing environment 200, including a management network 212, a data network 214, external networks 216, which may be include core networks 217, and an Application Programming Interface (API) network 210.

The network nodes 202 correspond to physical servers within a datacenter. The physical servers that provide the network nodes 202 run applications that allow them to act as network components such as a router. The network nodes 202 are used to connect physical systems within the datacenter to an external network 216 that connects to an access network 218. The external network 216 may be part of the access network. The network nodes 202 correspond to the physical network resources 110 and virtual network resources 118 described above. The network nodes 202 may be implemented as dedicated physical servers, or, the network nodes 202 may be implemented by distributing the network component function across the compute nodes 204. One example of a network node 202 includes the open-source cloud computing software platform provided by the Openstack Foundation under the name OpenStack™ via the network node service called a Neutron Gateway. Another example includes, from the same open-source cloud computing software, the Distributed Virtual Router (DVR).

The compute nodes 204 represent the majority of servers within the datacenter. The compute nodes 204 provide data processing services for client devices outside the datacenter. For example, the compute nodes 204 correspond to the physical compute resources 106 and virtual compute resources 114 described above. The compute nodes 204 are connected to each other and to the network nodes 202 via a data network 214.

The control nodes 206 correspond to servers that run management applications that run the datacenter and the cloud computing environment within the datacenter. For example, the control nodes 206 correspond to the infrastructure manager 124 described above. The control nodes 206 connect to the compute nodes 204 and network nodes 202 through a management network 212. The management network 212 may be part of the core network. The management network 212 may be a virtual network that traverses the same physical cables as the data network 214. Various technologies can be used to run separate virtual networks over the same physical infrastructure. One example of such a technology is Virtual Local Area Network (VLAN) technology. Such technology involves tagging individual data packets with a VLAN identifier (ID) for the VLAN to which they belong.

The control nodes 206 also provide an API to external client devices (not shown). The API allows external entities to instruct the control nodes 204 how to provision various virtual machines on the compute nodes 204 for use by the external entity. API related traffic may be routed over the API network 210. One example of an external entity is a VNF manager (e.g. 126, FIG. 1). A VNF manager may use API access calls to cause the controller nodes 206 to configure the compute nodes 206 as desired for the purpose of running VNFs on the compute nodes 204.

As described above, when a VNF runs on one or more of the compute nodes 204, data traffic to both the core network and the access network traverses the data network 214. This can cause various security concerns. Accordingly, it is desirable to have a VNF that can communicate with the access network and core network on physically isolated networks.

Figure 3:
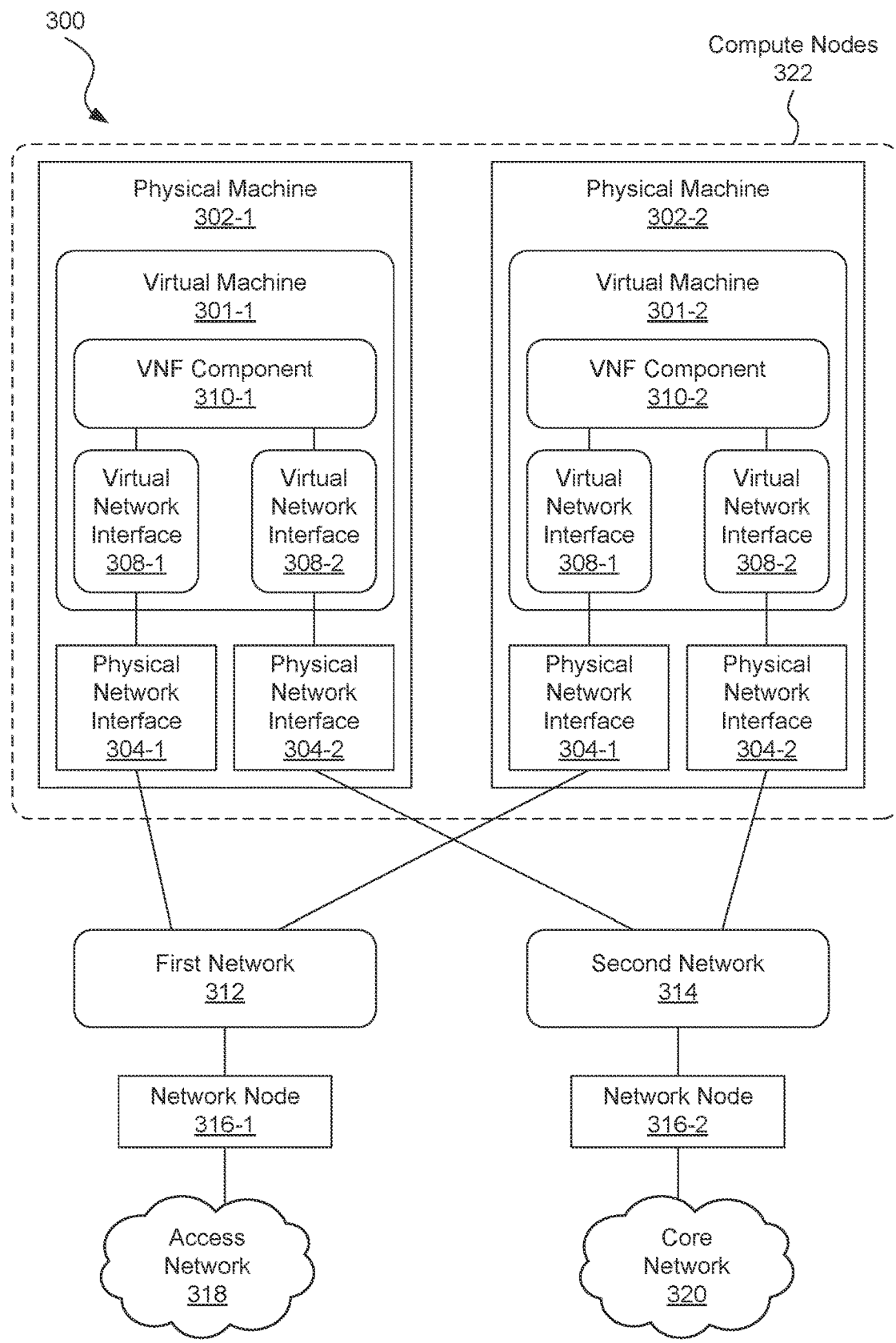
FIG. 3 is a diagram showing network isolation between an access network and a core network for a VNF, according to one example of principles described herein.

FIG. 3 is a diagram showing network isolation between an access network 318 and a core network 320 for a VNF. According to the present example, a plurality of physical machines 302-1, 302-2 within a datacenter include more than one physical network interface 304-1, 304-2. In the present example, each physical machine 302-1, 302-2 includes a first physical network interface 304-1 and a second physical network interface 304-2. Additionally, instead of having a single data network, the datacenter includes at least two isolated networks 312, 314. The first network 312 is used to connect the physical machines 302-1, 302-2 to the access network 318. The second network 314 is used to connect the physical machines 302-1, 302-2 to the core network 320.

The access network 318 may include any networking equipment such as routers, switches, and cables that exist between customer devices such as a phone to the service provider's core network 320. In some cases, the access network 318 may include the Internet. In some cases, the access network 318 may include various circuit-switched networks. In some cases, the access network 318 may include various technologies, such as DOCSIS, DSL/ADSL, LTE, or FTTx. Alternatively, a network connected between service providers, known as a "peering" network, may be considered an access network as it exists outside the operator's core network. In these cases, the access network 318 may include circuit switched, MPLS, carrier Ethernet or SONET connections.

The core network 320 includes the service provider's own network of devices that provide telecommunication services to the subscriber. The core network includes the equipment that provides the functionality of connecting one subscriber to another and transferring data, in various formats, between the subscribers. In many cases, a VNF, such as one that virtualizes an SBC, acts as the demarcation point between the access network 318 and the core network 320.

The physical machines 302-1, 302-2 are compute nodes 322 that correspond to the compute nodes 204 described above. Each physical machine 302-1, 302-2 includes at least one processor and a memory. A physical machine 302-1, 302-2 may run a host operating system that provides applications with access to the physical resources that include the processor and the memory. Various applications running on the physical machine may use either of the physical network interfaces 304-1, 304-2. The physical network interfaces 304-1, 304-2 may be, for example, Ethernet ports. The physical network interfaces 304-1, 304-2 may include Network Interface Cards (NICs). Thus, physical network interface 304-1 and physical network interface 304-2 are separate and distinct Ethernet ports to which at least two separate Ethernet cables connect.

As described above, a physical machine 302-1, 302-2 may run one or more virtual machines 301-1, 301-2. For example, the host operating system may provide a hypervisor application with access to the physical resources of the physical machine 302-1, 302-2. The hypervisor presents a virtual machine to a guest operating system. The virtual machine includes virtual resources such as a virtual processor and virtual memory. The guest operating system provides various applications, such as a VNF component 310-1, 310-2 with access to those virtual resources. The hypervisor then maps those virtual resources to the underlying physical resources.

In the present example, the virtual resources of a virtual machine 301-1, 301-2 include virtual network interfaces 308-1, 308-2. According to principles described herein, virtual network interface 308-1 is mapped to physical network interface 304-1 by the hypervisor. Additionally, virtual network interface 308-2 is mapped to physical network interface 304-2 by the hypervisor. Thus, when a virtual machine 301-1, 301-2 sends data packets to virtual network interface 304-1, those data packets get sent out over physical network interface 304-1. Likewise, when a virtual machine 301-1, 301-2 sends network packets to virtual network interface 304-2, those network packets get sent out over physical network interface 304-2. Data packets sent out over physical network interface 304-1 are sent over the first network 312. Data packets sent out over the physical network interface 304-2 are sent over the second network 314, which is physical isolated from the first network 312.

In one example, both the first network 312 and the second network 314 are packet-switched Ethernet networks. Each network 312, 314 may include a variety of networking components such as switches, routers, and Ethernet cables. Other types of physical media may be used as well. For example, the networks 312, 314 may be include fiber optic connections. In some examples, the physical network interfaces 304-1, 304-2 may be optical network interfaces.

The network nodes 316-2, 316-2 may be servers within the datacenter that run applications that allow them to perform routing functions. For example, network node 316-1 can act as a gateway between the first network 312 and the public access network 318. Likewise, network node 316-2 can act as a gateway between the second network 314 and the private core network 320. The network nodes 316-1, 316-2 may correspond to the network nodes 202 described above.

Using principles described herein, when a client device (not shown) wishes to use the telecommunication services that utilize a VNF, the client device transmits data over the access network 318. That data is then routed through network node 316-1 onto the first network 312. The data is eventually transmitted to the physical network interface 304-1 of physical machine 302-1. The physical machine 302-1 then maps the data to virtual network interface 308-1 of virtual machine 301-1. The data is then passed from the virtual network interface 308-1 to the VNF component 310-1. After processing the data, the VNF component sends the processed data out using virtual network interface 308-2 of the virtual machine 301-1. The physical machine 302-1 then maps the processed data to physical network interface 304-2, where it is sent out over the second network 314. The processed data is then routed through network node 316-2 to the private core network 320.

In one example, the VNF components 301-1, 301-2 place data packets for the access network 318 on a first VLAN and place data packets for the core network 320 on a second VLAN. The virtual machines 301-1, 301-2 can be configured so that traffic tagged with a VLAN ID for the first VLAN uses the first virtual network interface 308-1 and thus is sent through the physical network interface 304-1 to the first network 312. Likewise, traffic tagged with a VLAN ID for the second VLAN uses the second virtual network interface 308-2 and thus is sent through the physical network interface 304-2 to the second network 314. In one example, the configuration of the virtual machines 301-1, 301-2 and physical machines 302-1, 302-2 may be done using an SDN controller.

Figure 4:
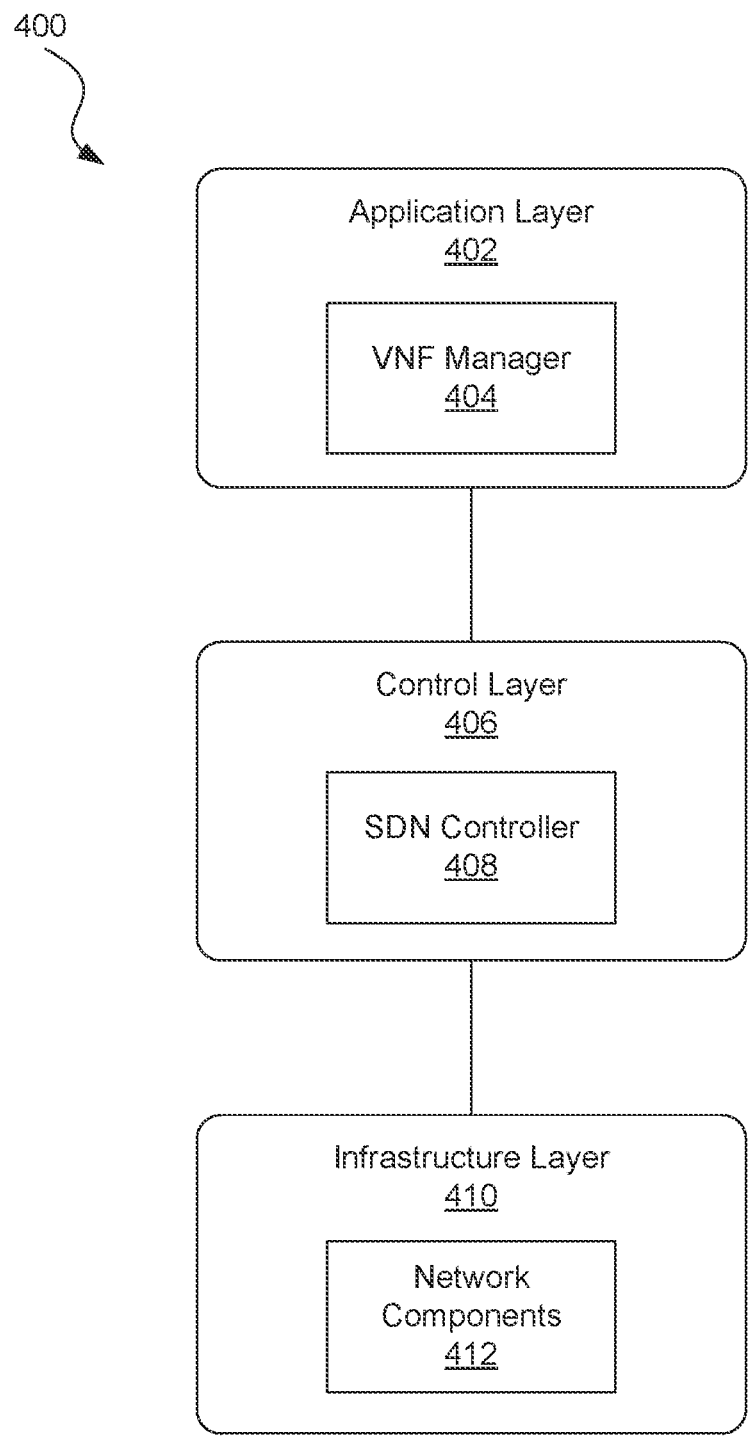
FIG. 4 is a diagram showing software-defined networking, according to one example of principles described herein.

FIG. 4 is a diagram showing SDN 400, according to one example of principles described herein. SDN 400 is a concept in which the control plane is separated from the data plane. Accordingly, SDN 400 includes an infrastructure layer 410, a control layer 406, and an application layer 402. The infrastructure layer 410 includes a number of network components 412. Such network components 412 may include physical routers, switchers, and other packet handling hardware. The infrastructure layer 402 thus includes the resources to move data packets between different computing systems.

In a virtual computing environment, different virtual machines may be interconnected over a virtual network. The virtual network may include virtual routers, virtual switches, and other virtual hardware that is used to handle data packets. Such virtual hardware may also be included within the network components 412 that make up the infrastructure layer 410.

The network components 412 of the infrastructure layer 410 are in communication with an SDN controller 408 of the control layer 406. The SDN controller 408 corresponds to the SDN controller 132 described above. The SDN controller 408 instructs each of the network components 412 how to direct network traffic. For example, the SDN controller 408 can provide a network component 412 with forwarding tables that instruct the network component 412 how to forward data packets headed for certain destinations. The SDN controller 408 is able to quickly and dynamically manage and adjust the network of the underlying infrastructure layer 402. The SDN controller 408 abstracts the implementation of network management to applications within the application layer 402.

The application layer 402 includes the applications that interface with the control layer 406 to instruct an SDN controller 408 how a network should be configured. Specifically, the SDN controller 408 provides an Application Programming Interface (API) to applications of the application layer 402. The applications instruct the SDN controller 408 how to configure the network for the purposes of the applications. In the present example, one of the applications in the application layer 402 is a VNF manager 404. The VNF manager 204 corresponds to the VNF manager 126 described above.

As will be described in further detail below, the VNF manager 404 can communicate with the SDN controller 408 and instruct the SDN controller 408 to establish new connections between a new virtual machine and other various virtual machines associated with a VNF (e.g. 120, FIG. 1). The precise details for such connections are abstracted by the SDN controller 408 from the VNF manager 404. Such virtual machines and other components of the virtual network that interconnect the virtual machines are part of the infrastructure layer 412.

According to principles described herein, when a VNF component is provisioned, that VNF component is configured to use the separate virtual and physical interfaces for core network traffic and access network traffic. To configure the VNF component, the VNF manager 404 instructs the SDN controller 408 to configure the virtual machine (e.g. 301, FIG. 3) that runs the VNF component (e.g. 310, FIG. 3) appropriately. In response, the SDN controller 408 sends instructions to the physical machine (e.g. 302, FIG. 3) associated with the VNF component. Such instructions cause the virtual machine to present two separate virtual network interfaces (e.g., 308-1, 308-2, FIG. 3) to the VNF component, each mapped to a different physical interface (e.g. 304-1, 304-1, FIG. 3). The VNF component then uses virtual network interface 308-1 for access network traffic and uses virtual network interface 308-2 for core network traffic.

Figure 5:
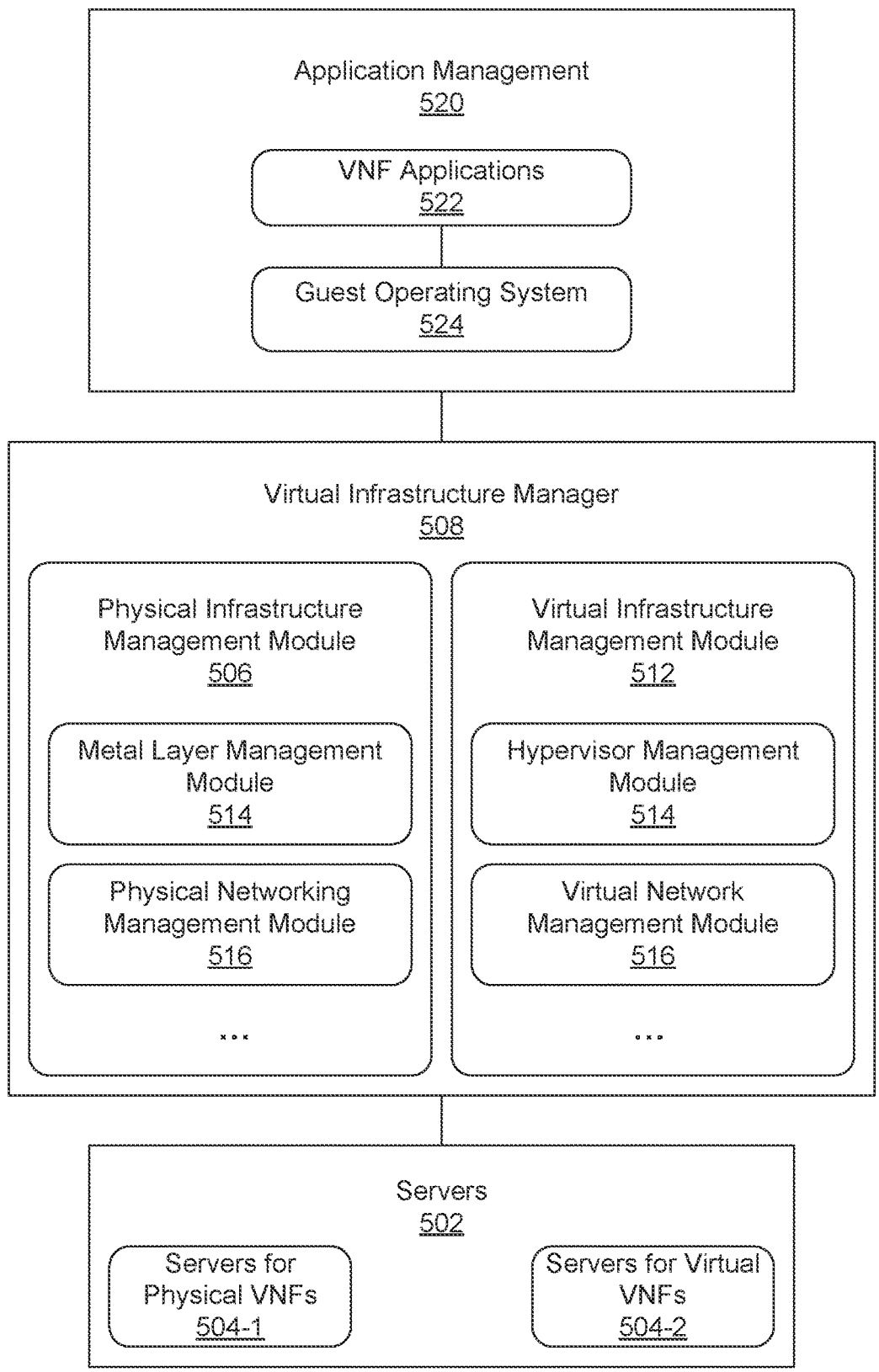
FIG. 5 is a diagram showing Metal-as-a-Service (Maas), according to one example of principles described herein.

FIG. 5 is a diagram showing a model 500 of NFV. According to the present example, the NFV model 500 includes a plurality of physical servers 502. Some of those servers 504-1 may be used to directly support VNFs. Some of those servers 504-2 may be used to support virtual VNFs. The model 500 also includes a virtual infrastructure manager 508 and an application layer 520.

The servers 502 may include a plurality of physical computing systems acting as servers 504. An example datacenter may include thousands of servers 502. Generally, each server should be configured before it can be used. Configuring a server may involve installing an operating system, adjusting the settings of that operating system, and adjusting other settings of the physical machine as desired. A metal layer management module can remotely configure such servers in an automated manner. Thus, an administrator does not have to physically go to each of the thousands of servers in the database to configure each server 502, at least for the automated parts of configuration.

The virtual infrastructure manager 508 includes a physical infrastructure management module 506 and a virtual infrastructure management module 512.

The physical infrastructure management module 506 can provide a service referred to as Metal as a Service (MaaS). While cloud computing allows for the provisioning of virtual machines for use by various entities, MaaS allows for on demand provisioning of physical systems. For example, a customer of a MaaS provider may desire use of one or more physical systems. The MaaS then provides those systems for use by the customer. The customer can then configure those physical systems as desired and run their applications on those configured physical systems. The customer may use the physical machines to run software directly thereon or the physical machines may be configured to provide a cloud computing, or virtual machine environment in which applications are run.

To use the physical servers 504-2 to provide a virtual machine environment, the physical infrastructure management module 506 can be used. The physical infrastructure management module 506 installs the appropriate software on a server to allow it to participate in a cloud or perform other desired functions. For example, the physical infrastructure management module 506 can remotely install a host operating system as well as cloud stack software such as OpenStack on servers 502 as desired. The physical infrastructure management module 506 utilizes the metal layer management module 514 to utilize various physical servers 504. For example, if the metal layer orchestration layer 506 determines that it needs four physical servers 504 to create the desired cloud environment, then the metal layer orchestration layer 506 requests use of four servers from the metal layer management module 514. The metal layer management module 514 can then provide four available servers for use by the physical infrastructure management module 506 as desired. The physical infrastructure management module 506 also includes a physical networking management module 516 for managing physical network resources. Other services may be included in the physical infrastructure management module.

The virtual infrastructure manager 508 further includes a virtual infrastructure management module 512. The virtual infrastructure management module 512 includes a hypervisor management module 514 and a virtual network management module 516. The virtual infrastructure management module 512 can manage a cloud, or a virtual computing environment. For example, the virtual infrastructure management module 512 can configure the hypervisors running on the physical machines through use of the hypervisor management module 514. Configuration of the hypervisors may involve setting the characteristics of virtual machines to be provided by the hypervisor. Characteristics of a virtual machine may include how much memory is to be available to the guest operating system and what kind of processing throughput is to be provided to the guest operating system. The virtual infrastructure management module 512 can also set up and manage virtual networks that connect the virtual machines within the cloud through use of the virtual network management module 516. For example, the virtual network management module 516 may assign networking addresses to the virtual machines and set up virtual routers and switches configured to route packets to and from the virtual machines. The virtual infrastructure management module 512 can also manage the virtual storage associated with the cloud.

With the managed cloud in place, as established by the virtual infrastructure management module 512, an application management layer 520 manages the applications that run on the cloud. For example, the application management layer 520 includes the guest operating systems 524 that run on the virtual machines of the cloud. The application management layer 520 also manages VNF applications 522 that run within the cloud computing environment. The VNF applications provide the functionality of the network nodes in a telecommunication network that were previously provided by a specialized piece of hardware.

In some examples, a VNF may include some VNF components that run on a virtual machine environment and some VNF components that run directly on physical machines. For example, the VNF components used for signaling purposes may be placed on virtual machines. Signaling involves the use of a communication protocol such as Session Information Protocol (SIP) to establish connections between two different devices. VNF components associated with bearer traffic can be placed directly on physical machines. Bearer traffic utilizes a communication protocol such as Real-time Transfer Protocol (RTP) to transmit communication data (e.g., voice, video) over an established communication session. VNF components associated with bearer traffic are typically more processor intensive and may thus benefit from various hardware accelerators that are available when the VNF component runs directly on a physical machine.

Some examples of hardware accelerators include Data Plane Development Kit (DPDK) and Digital Signal Processing Kit (DSPK). DPDK is a technology that allows for faster packet processing. Faster packet processing can be beneficial for VNF components that are associated with Internet Protocol (IP) based telecommunication services. In a specialized piece of hardware, the packet processing functionality may have utilized a separate processor designed specifically with data packet processing technology. But, the physical computing systems running the virtual machines, or running the VNF components directly, may include processors that have the data packet processing technology integrated within the main processors. DSPK is a technology that allows for faster digital signal processing. Such processing is common for use by VNF components. Again, a specialized piece of hardware may use a special processor for digital signal processing. But, the physical computing systems running the virtual machines, or running the VNF components directly, may include processors that have the digital signal processing technology integrated within the main processors. When the VNF component is run directly on a physical computing system, it can more efficiently take advantage of these hardware accelerators.

Figure 6:
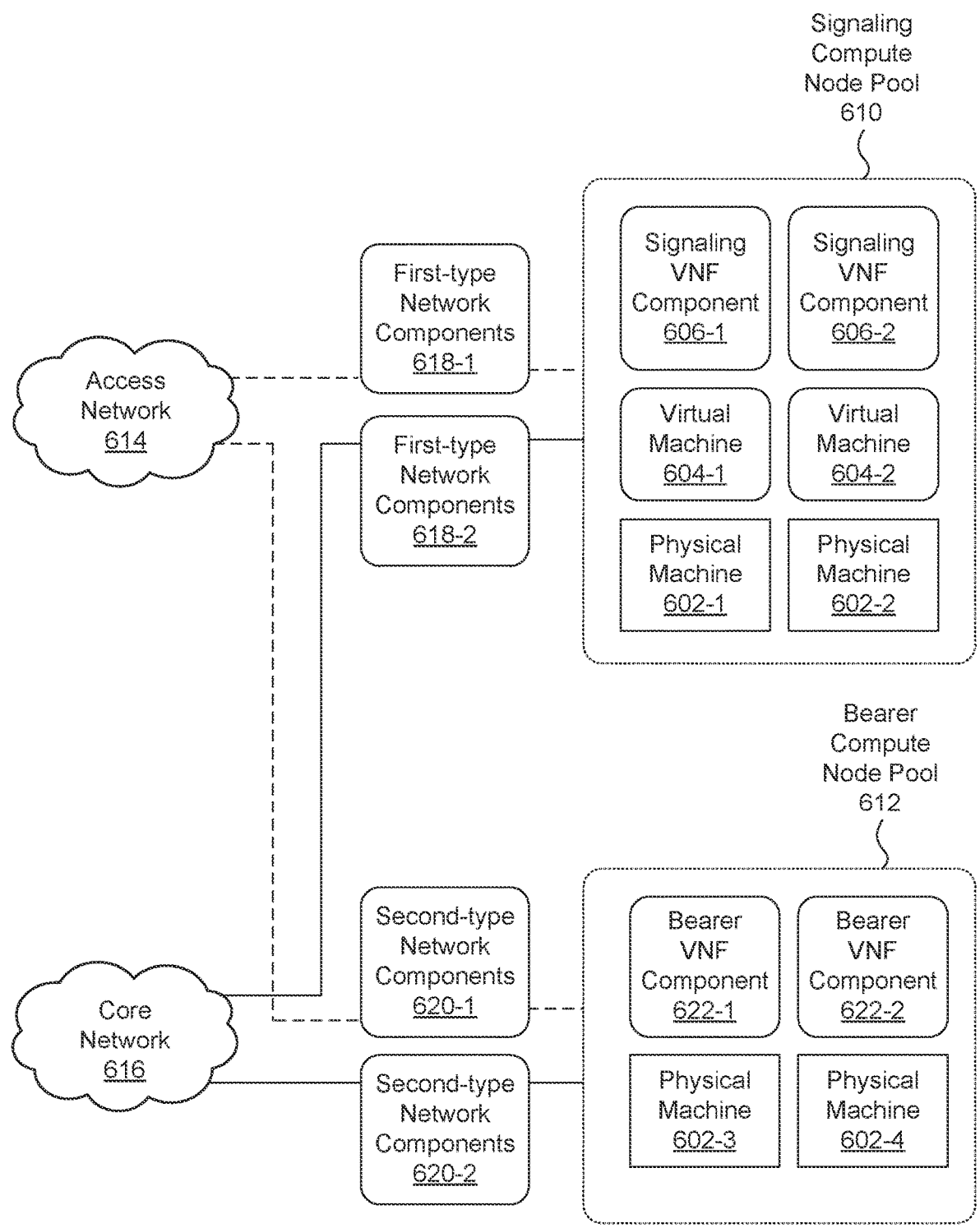
FIG. 6 is a diagram showing separation of VNFs used for signaling traffic and VNFs used for bearer traffic, according to one example of principles described herein.

FIG. 6 is a diagram showing separation of VNF components used for signaling traffic and VNF components used for bearer traffic. In some cases, a datacenter operator may offer tiered services. Specifically, the datacenter operator may provide physical machines having varying processing capability. The datacenter operator may also provide physical machines connected with different types of switches having different throughput capabilities. Generally, the datacenter operator charges more for the physical machines with higher processing power and for physical machines connected to switches with a higher throughput.

According to principles described herein, a VNF includes a set of signaling VNF components 606-1, 606-2 and a set of bearer VNF components 622-1, 622-2. The signaling VNF components 606-1, 606-2 are run on physical machines 602-1, 602-2 within a signaling compute node pool 610 and the bearer VNF components 622-1, 622-2 are run on physical machines 602-3, 602-4 of a bearer compute node pool 612.

The physical machines 602-1, 602-2 within the signaling compute node pool 610 are configured to support virtual machines 604-1, 604-2. Specifically, the physical machines 602-1, 602-2 have hypervisors installed thereon that present a virtual machine to a guest operating system. The hypervisors map the virtual resources of the virtual machines 604-1, 604-2 to the physical resources of the physical machines 602-1, 602-2. The virtual machines 604-1, 604-2 run the signaling VNF components 606-1, 606-2. The physical machines 602-1, 602-2 each include at least two physical network interfaces as described above. The virtual machines 604-1, 604-2 also each include two virtual network interfaces that map to the different physical network interfaces. This allows for network traffic associated with the access network 614 to be sent over a first network that includes the first-type network components 618-1. Network traffic associated with the core network 616 is sent over a second network that includes first-type network components 618-2.

The physical machines 602-3, 602-4 are configured to directly support the VNF components 622-1, 622-2 and may not be configured to support a virtual machine environment. For example, the physical machines 602-3, 602-4 may have a host operating system such as Linux. The host operating system of the physical machines 602-3, 602-4 provides the applications that make up the VNF components 622-1, 622-2 with direct access to the physical hardware resources of the physical machines 602-3, 602-4. There is no virtual machine or hypervisor between the applications and physical hardware resources in such case. Thus, the host operating system of the physical machines 602-3, 602-4 does not provide the VNF components 622-1, 622-2 with access to virtual resources like the guest operating system described above. The physical machines 602-3, 602-4 each include at least two physical network interfaces as described above. Thus, data traffic associated with the access network 614 is sent over a first network that includes the second-type network components 620-1. Data traffic associated with the core network 616 is sent over a second network that includes the second-type network components 620-2. Because the bearer VNF components 622-1, 622-2 may be more processor intensive, they may be placed directly on physical machines to take advantage of hardware accelerators as described above.

According to one example of principles described herein, the second-type network components 620-1, 620-2 allow for greater throughput than the first-type network components 618-1, 618-2. For example, the first-type network components 618-1, 618-2 may include 10 gigabit switches and the second-type network components 620-1, 620-2 may include 100 gigabit switches. Provisioning the VNF in such a manner allows for a more efficient utilization of resources. Specifically, the signaling VNF components 606-1, 606-2, which involve less throughput, are placed on physical machines 602-1, 602-2 that are connected to network components having less throughput. Thus, the VNF components 606-1, 606-2 do not utilize higher throughput switches (e.g. second-type network components 620-1, 620-2), which the VNF components 606-1, 606-2 may not fully utilize.

Figure 7:
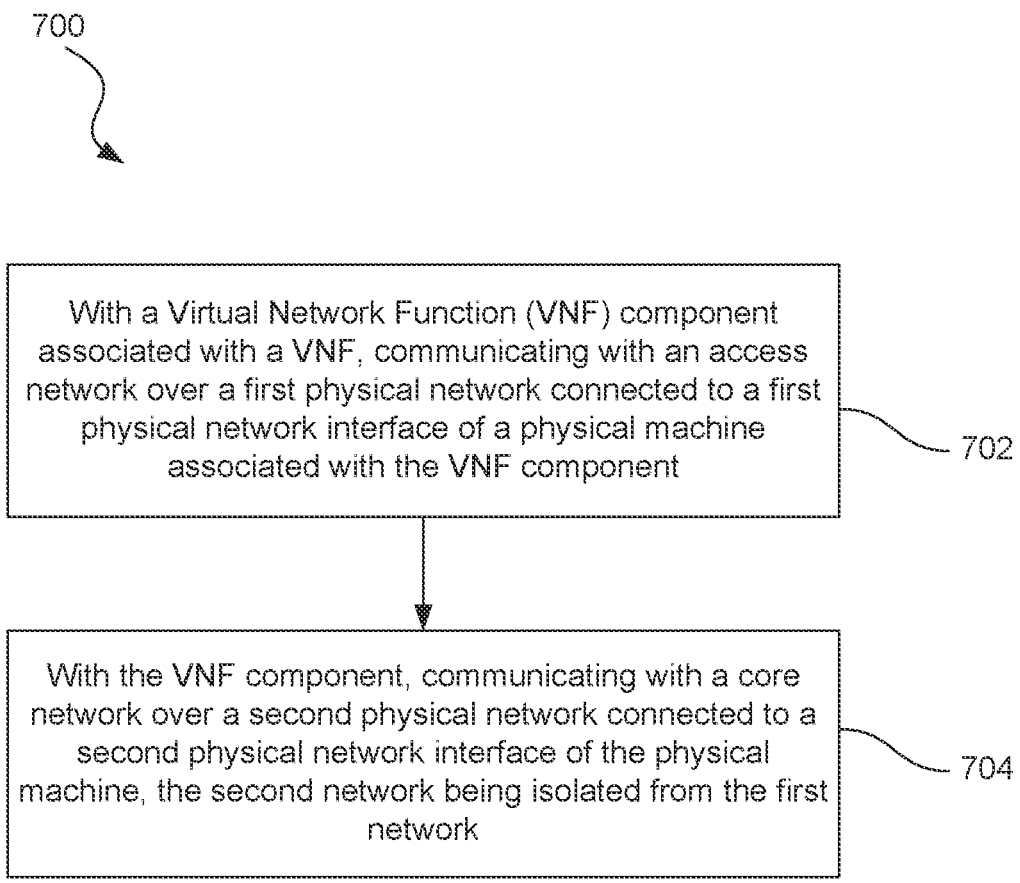
FIG. 7 is a flowchart showing an illustrative method for communication between an access network and a core network with a VNF, according to one example of principles described herein.

FIG. 7 is a flowchart showing an illustrative method 700 for communication between an access network and a core network with a VNF. A VNF component may utilize virtual machines and/or physical machines to perform the method 700. According to the present example, the method 700 includes a step 702 for, with a VNF component associated with a VNF, communicating with an access network over a first physical network connected to a first physical network interface of a physical machine associated with the VNF component. To send data to the access network, the VNF component sends data to a first virtual network interface associated with the access network. To receive data from the access network, the VNF component reads data from the first virtual network interface. The first virtual network address is mapped to a first physical network interface that is connected to a first network that connects to the access network. Thus, any communication sent to or received from the first virtual network interface travels over the first network to the access network.

The method 700 further includes a step 704 for, with the VNF component, communicating with a core network over a second physical network connected to a second physical network interface of the physical machine, the second network being isolated from the first network. To send data to the core network, the VNF component sends data to a second virtual network interface associated with the core network. To receive data from the core network, the VNF component reads data from the second virtual network interface. The second virtual network address is mapped to a second physical network interface that is connected to a second network that connects to the core network. Thus, any communication sent to or received from the second virtual network interface travels over second first network to the core network. Because the second network is physically isolated from the first network, access network traffic and core network traffic do not traverse the same physical cables within the datacenter.

To allow the VNF component to communicate with the access network and core network using separate networks, the VNF manager can instruct an SDN controller to configure various network components and physical machines as desired. For example, the SDN controller can send instructions to the physical machines within the datacenter. Such instructions may tell a hypervisor how to map virtual network connections to the different physical network connections. Typically, a hypervisor may map multiple virtual network interfaces to the same physical network interface of the physical machine. But, using principles described herein, the SDN controller can instruct the hypervisor to map a particular virtual network interface to a particular network interface. Specifically, the virtual network interface that the VNF component uses for core network traffic is mapped to one physical network interface while the virtual network interface that the VNF component uses for access network traffic is mapped to a different physical network interface.

In some examples, the SDN controller can configure other network components such as routers and switches within the datacenter. Specifically, the SDN controller can instruct such components how to forward certain types of traffic. For example, the SDN controller may configure the network components (e.g. 618-1, 618-2, 620-1, 620-2) within the datacenter to forward traffic appropriately.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system comprising:
a plurality of physical machines, each physical machine executing a virtual machine that runs a Virtual Network Function (VNF) component of a VNF, each physical machine comprising:
a first physical network interface; and
a second physical network interface;
wherein each VNF component uses a first virtual network interface and the first physical network interface of its respective physical machine to communicate with a first network and uses a second virtual network interface and the second physical network interface of its respective physical machine to communicate with a second network isolated from the first network, wherein the VNF component acts as a demarcation point between the first and second networks such that traffic for the first network is not shared on any network cable with traffic for the second network.

2. The system of claim 1, wherein the first physical network connects to an access network.

3. The system of claim 1, wherein the second physical network connects to a core network.

4. The system of claim 1, wherein the VNF component is associated with signaling traffic.

5. The system of claim 1, wherein the VNF component is associated with bearer traffic.

6. The system of claim 1, wherein the VNF comprises one of: a Session Border Controller (SBC), an Internet Protocol (IP) Multimedia Subsystem (IMS) core, and a telephony application server.

7. The system of claim 1, wherein the first and second physical networks are established via an SDN controller.

8. The system of claim 1, where each virtual machine comprises the first virtual network interface mapped to the first physical network interface and the second virtual network interface mapped to the second physical network interface.

9. The system of claim 8, wherein the VNF component is configured to communicate with the first physical network through the first virtual network interface and communicate with the second physical network through the second virtual network interface.

10. A method comprising:
with a first virtual network interface of a Virtual Network Function (VNF) component, communicating with a first physical network connected to a first physical network interface of a physical machine executing the VNF component, the physical machine being in a datacenter; and
with a second virtual network interface of the VNF component, communicating with a second physical network connected to a second physical network interface of the physical machine, the second physical network being isolated from the first physical network, wherein the VNF component serves as a demarcation point between the first and second networks such that access network traffic and core network traffic traverse different physical network cables in the datacenter.

11. The method of claim 10, wherein the VNF component runs directly on the physical machine.

12. The method of claim 10, wherein the VNF component is provisioned using Metal as a Service (MaaS).

13. The method of claim 10, wherein the VNF component runs on a virtual machine running on the physical machine.

14. The method of claim 13, wherein the first virtual network interface is mapped to the first physical network interface and the second virtual network interface is mapped to the second physical network interface; and
wherein the VNF component is configured to communicate with an access network through the first virtual network interface and communicate with a core network through the second virtual network interface.

15. The method of claim 10, further comprising, with a VNF manager that manages the VNF, instructing a Software-Defined Networking (SDN) controller to map a first virtual network interface to the first physical network interface and map a second virtual network interface to the second physical network interface.

16. The method of claim 10, wherein the VNF component runs on a virtual machine running on the physical machine, and further wherein the VNF component is associated with signaling traffic.

17. The method of claim 10, wherein the physical machine is one of a plurality of physical machines within the datacenter, each of the physical machines comprising:
a first network interface connected to the first physical network; and
a second network interface connected to the second physical network.

18. A system comprising:
a plurality of physical computing systems, each of the physical computing systems comprising a processor, a memory, and at least two physical network interfaces;
a first network connected to a first one of the physical network interfaces for each of the physical computing systems, the first network being connected to an access network; and a second network connected to a second one of the physical network interfaces for each of the physical computing systems, the second network being connected to a core network, the second network being isolated from the first network, wherein a Virtual Network Function (VNF) component serves as a demarcation point between the first and second networks, such that traffic for the access network and traffic for the core network traverse different physical cables.

19. The system of claim 18, wherein the first network and the second network comprise packet switched Ethernet networks.

20. The system of claim 18, wherein at least one of the plurality of physical computing systems is configured to provide a cloud computing environment to run VNF components of the VNF and at least one of the plurality of physical computing systems is configured to directly run VNF components of the VNF.

* * * * *